United States Patent [19]
Clifford, Jr.

[11] Patent Number: 5,276,566
[45] Date of Patent: Jan. 4, 1994

[54] RECORDING/READING HIGH DENSITY DATA TRACKS WITH BACKWARD COMPATIBILITY

[75] Inventor: George M. Clifford, Jr., Los Altos Hills, Calif.

[73] Assignee: Hewlett-Packard Company, Palo Alto, Calif.

[21] Appl. No.: 795,066

[22] Filed: Nov. 20, 1991

[51] Int. Cl.$^5$ .................... G11B 15/14; G11B 21/02
[52] U.S. Cl. ........................................ 360/64; 360/75
[58] Field of Search ............... 360/64, 75, 8, 84, 121, 360/65, 18

[56] References Cited

U.S. PATENT DOCUMENTS

| | | | |
|---|---|---|---|
| 4,101,947 | 7/1978 | Lambeth | 360/18 X |
| 5,012,355 | 4/1991 | Taga et al. | 360/64 |
| 5,032,934 | 7/1991 | Aikawa et al. | 360/65 |
| 5,051,846 | 9/1991 | Tsushima et al. | 360/64 |

OTHER PUBLICATIONS

Dictionary of Computers, Information Processing, and Telecommunications, 2nd Ed., p. 656, Jerry Rosenberg, ©1987 by John Wiley & Sons, N.Y.

*Primary Examiner*—Aristotelis Psitos
*Assistant Examiner*—Jennifer Pearson

[57] ABSTRACT

A high density helical scan recording device having write/wide-read heads and RAW/narrow-read heads of different widths to permit an increase in the density of data tracks and to allow backward compatibility for reading and recording conventional density data tracks. The write/wide-read heads are used to record data in tracks of either the conventional density or the high density. The write/wide-read heads are also selected to read conventional density data tracks. The RAW/narrow-read heads have a reduced width that permits reading of data tracks in which greater than two-thirds of each data track has been overlapped by an adjacent data track. The RAW/narrow-read heads are used in a read-after-write (RAW) capacity and are used during a read operation of the high-density data tracks.

14 Claims, 2 Drawing Sheets

RECORDING/READING HIGH DENSITY DATA TRACKS WITH BACKWARD COMPATIBILITY

DESCRIPTION

1. Technical Field

The present invention relates generally to helical scan recording devices and more particularly to recording and reading data in high density helical scan data tracks.

2. Background Art

Recording data on a length of magnetic tape is typically performed in tracks that extend parallel to the length of the tape. While there have been many advances in increasing the data density within longitudinal tracks and increasing the density of tracks, limitations on density are imposed by the ability to meet exacting mechanical tolerances and by the increased susceptibility to crosstalk from data recorded on adjacent tracks with each increase in density.

In helical scan recording, data tracks are recorded at an angle relative to a lengthwise edge of the magnetic tape. A rotating drum having at least one write head contacts the magnetic tape. The tape passes over the drum at an angle, so that a data track traces a partial helix on the drum. Commonly, there are two write heads that are 180° apart on the drum. Separate read-after-write (RAW) heads may be used to detect errors of significant size or quantity. Read-after-write is a technique which improves data integrity by reading tracks to determine whether data have been successfully written. The data can be rewritten if needed.

Helical scan devices are used in video, audio and computer applications. Various helical scan tape formats and drive designs exist for both digital and analog data. Digital data storage (DDS) is a recording format which builds on the technique referred to as digital audio tape (DAT) to provide a recording format for computer data. Storage of 1.3 gigabytes of data on a 60m tape is known, but longer tapes having a reduced thickness may also be used to increase capacity beyond 1.3 gigabytes. Two write heads having different azimuths are employed to record data in adjacent tracks, with the two tracks forming a frame. Approximately sixty percent of a track is user data, with the rest consisting of automatic track finding (ATF) that is used to center a head on a track during read operations and Sub-code areas which facilitate fast searching.

The two write heads record data on alternate tracks, thereby forming a frame. The magnetic gap of each write head is oriented with a different azimuth with respect to the track direction, so that adjacent tracks contain magnetic transitions with different azimuths. For example, in the DDS format, the azimuth of the two tracks are approximately $+20°$ and $-20°$. A data track can be read only with the same write head or with a read head having the same azimuth as the track. Alternating the azimuths reduces crosstalk from adjacent tracks when reading data. Using the DDS format, the track width after completion of recording is not equal to the width of the write heads. Conventionally, write heads have a width of approximately $20.4\mu m$. Initially, a track width will have a corresponding dimension, but the track will be reduced to approximately $13.6\mu m$ when the following track is written. Each track partially overwrites the previous track, effectively reducing the width of the previous track. The degree of overlap is dependent upon the ratio of the speed of the heads to the speed of the longitudinally moving magnetic tape. The track width, and consequently the track pitch, are defined by the amount of overlap.

After the recording of data in data tracks, one or more read heads are used to read the data. Where adjacent tracks have magnetic transitions having different azimuths, two read heads having different azimuths are required. The write heads may function as the read heads, but a helical scan device having dedicated heads to provide read-after-write capability typically use the read-after-write heads to also serve as read heads.

A read head is also wider than the reduced track width, so that the read head partially overlaps the two adjacent tracks when the read head is correctly centered over a target track. This overlap is used to produce a position error signal during the read operation. Position signals are recorded at the beginning and end of each track at a spatial frequency which is insensitive to the different azimuths of the read heads. This allows position signals to be read from the adjacent tracks by the read head. The position error signal is generated by reading the position signals from the two adjacent tracks, while ignoring the position signal from the target track. An amplitude difference of these readings of position signals generates a position error signal for a tracking servo controller. The servo adjusts the speed of tape travel accordingly in order to maintain the read head in a correct position.

A goal of future tape drive designs is to increase the data capacity of a tape cartridge. One method of accomplishing this is to decrease the width of the data tracks, allowing more tracks to be written on a tape. However, using a conventional head design to read a narrower, high density track would be difficult, at best. The overlap of a head into adjacent tracks would extend beyond the adjacent tracks and cause reading and tracking problems. For example, if the track width were reduced to $6\mu m$, a $20.4\mu m$ head would overlap more than three tracks. This would result in the read head extending into a second track having the same azimuth as the target track. The resulting crosstalk would obscure the desired data. The read head positioning would also be adversely affected, since the above-described scheme of generating a position error signal relies upon less than a full overlap of a read head onto the two tracks adjacent to a target track.

It is an object of the present invention to provide a helical scan device and method which increases the data capacity of a given area of magnetic tape. It is a further object to provide such a device which permits recording and reading of data both to and from a narrow, high density track and to and from a conventional, lower density track.

SUMMARY OF THE INVENTION

The above objects have been met by a helical scan recording device and method which utilize conventional size primary heads to record narrower, high-density data tracks, but which adapt secondary heads so as not to render the device more susceptible to crosstalk and tracking errors. Without an increase in the number of magnetic heads on a rotating helical scan drum, reading and writing "backward compatibility" between conventional density tracks and high density tracks is achieved by selection of heads during a read operation. The primary heads are write/wide-read heads utilized to selectively write either the conventional width or the narrow tracks and also to read the conventional width tracks. The secondary heads are RAW/narrow-read heads that are utilized to read the narrow tracks and to perform in a read-after-write capacity during recording of both the conventional width and the narrow tracks. Unlike helical scan devices of the prior art, the heads do not have a uniform width. Instead, each of the secondary heads has a width less than the widths of the primary heads.

The helical scan recording device includes a rotary drum having a pair of write/wide-read heads that are spaced apart by 180° and a pair of RAW/narrow-read heads that are likewise spaced apart by 180°, so that the heads are approximately 90° to each other. During the record operation, the write/wide-read heads sequentially record data on a length of magnetic tape in data tracks disposed at a track angle to a lengthwise edge of the magnetic tape. The RAW/narrow-read heads act in a manner typical of read-after-write heads to verify that the data have been correctly written. The tape is moved in a lengthwise direction. The relative movement of the rotary drum and the tape determines the degree of overlap of a sequentially lagging data track onto an immediately preceding data track, thereby reducing track width. Conventionally, the overlap is less than 50% of the initial width. The present invention allows reading and writing with an overlap of greater than two-thirds to provide narrow high-density data tracks, as well as the conventional width data tracks. If the write/wide-read heads were used in reading the narrow, high-density data tracks, the heads would extend onto not only the data tracks adjacent to a target track, but also onto at least one data track having the same azimuth as the target track. The desired data would consequently be obscured. However, by employing RAW/narrow-read heads that are narrower than the write/wide-read heads, the present invention is able to read the high-density data tracks.

As noted, the RAW/narrow-read heads are utilized to read data from the high-density tracks after completion of the recording operation. To achieve backward compatibility with tapes having data recorded in conventional, wider tracks, the present invention includes selecting between the RAW/narrow-read heads and the write/wide-read heads during a read operation, depending upon track width. Thus, one advantage of the present invention is that an increase in storage capacity is achieved. Another advantage is that the helical scan recording device is a device having backward read and write compatibility with prior art devices and methods.

BEST MODE FOR CARRYING OUT THE INVENTION

Figure 1:
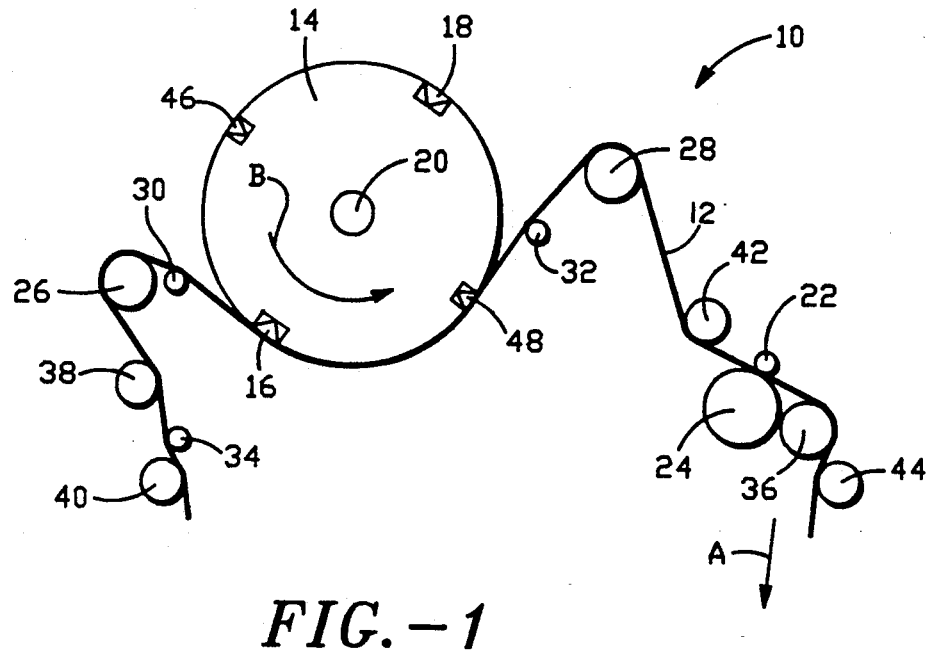
FIG. 1 is a schematic top view of a helical scan recording device in accord with the present invention.

Referring to FIG. 1, a helical scan recording and reproducing device 10 includes a magnetic tape 12 that is brought into contact with a rotary drum 14. A wrap angle of approximately ninety degrees is shown. That is, the magnetic tape makes contact with approximately ninety degrees of the rotary drum. A wrap angle of approximately ninety degrees is typical in digital audio tape (DAT) technology. The wrap angle is typically larger in video recording. The present invention is applicable to any of video, audio and computer applications, regardless of wrap angle. The term "data" is defined as including digital and analog recordations for any of these three applications.

In helical scan recording, data tracks are written diagonally across a tape. This is achieved by mounting two write/wide-read heads 16 and 18, hereinafter referred to as "primary heads," one hundred eighty degrees apart on the rotary drum 14 and placing the axis of the drum at slightly greater than six degrees to the vertical. A motor-driven shaft 20 rotates the drum, as indicated by arrow B. Rotation of the shaft 20 may be at a rate of 2000 rpm, but the rotational speed is not critical to the present invention.

At the same time that the rotary drum 14 is driven at a high rate, the magnetic tape 12 is caused to move relatively slowly in the direction indicated by arrow A. In prior art DAT recording, the drum is rotated at 2000 rpm for an outer surface velocity of approximately 3.14m/sec and the tape is moved in the same direction at approximately 8.15m/sec. The tape is driven by a capstan 22 and pinch roller 24 assembly. The speed of the tape is controlled by adjusting the speed of the capstan. The pinch roller 24 holds the tape against the capstan and is free to rotate. A pair of guide rollers 26 and 28 and a pair of inclination posts 30 and 32 guide the tape against the circumference of the rotary drum. With insertion of a tape cartridge, each of the pinch roller 24, guide rollers 26 and 28 and inclination posts 30 and 32 is caused to withdraw a portion of the magnetic tape from the cartridge. A tension post 34 and a guide roller 36 are likewise caused to move with insertion of the cartridge. The tension post 34 is a sensor utilized to control tension of tape from a supply reel, not shown. Also included are four fixed posts 38, 40, 42 and 44, which may be replaced by rotating rollers.

Spaced apart from the primary heads 16 and 18 along the circumference of the rotary drum 14 are RAW/narrow-read heads 46 and 48, hereinafter referred to as "secondary heads." As will be explained more fully below, each secondary head has a width that is less than the width of the primary heads. The "width" of a head is defined here as the dimension that is substantially perpendicular to the length of a target data track and disregards any head structure that may extend beyond the magnetic gap of the head. Where the magnetic gap is at an angle relative to the target data track in order to achieve a desired azimuth, the "width" of the head will be less than the longitudinal dimension of the magnetic gap.

Figure 2:
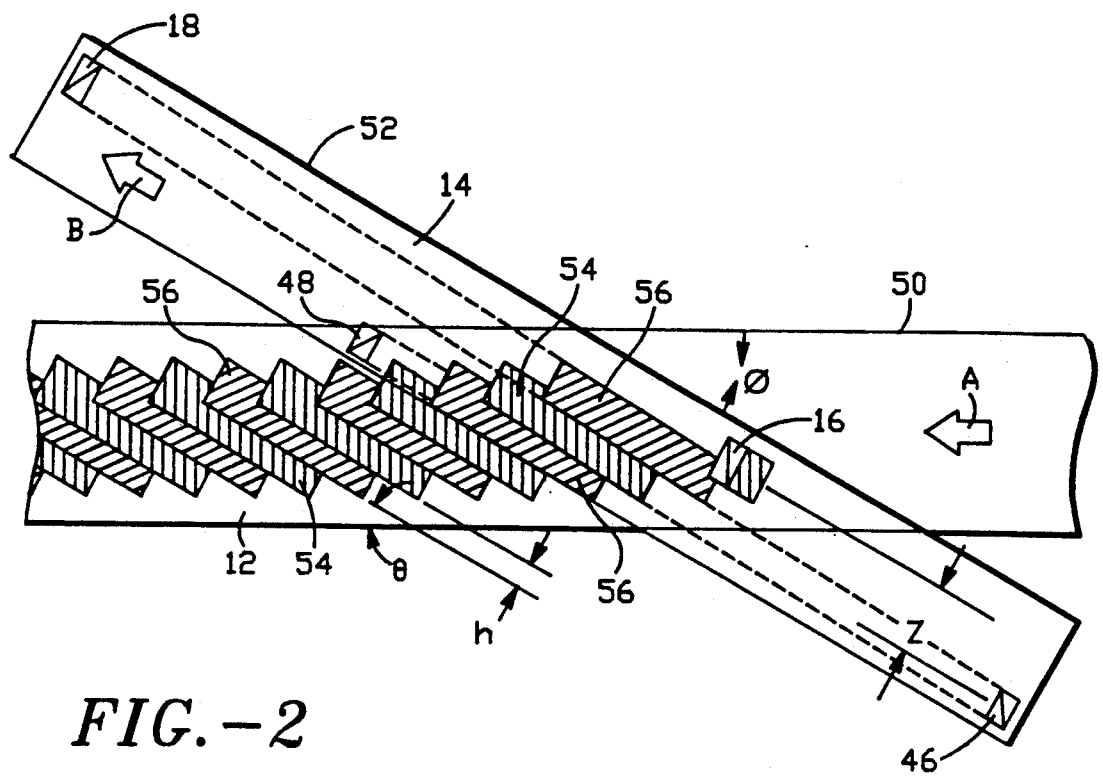
FIG. 2 is a schematic illustration of a magnetic tape and rotary drum assembly, wherein the magnetic tape has data tracks of conventional width for which data track read-after-write occurs following 450° of drum rotation, and wherein the rotary drum and the magnetic tape are shown unwrapped into a planar condition.

Referring now to FIG. 2, for purposes of illustration the magnetic tape 12 is shown in an unwrapped condition and the circumference of the rotary drum 14 is shown as being planar. The tape is moved in the direction indicated by arrow A and the drum is rotated in the direction indicated by arrow B. One fixed dimension is the axial separation (z) from the center line of a primary head 16 to the center line of a secondary head 46. Also fixed is the helix angle ($\phi$) from a lengthwise edge 50 of the magnetic tape 12 to an edge 52 of the rotary drum 14. DAT utilizes a helix angle slightly greater than six degrees and an axial separation z of approximately 37.3$\mu$m. A track angle (8) between the edge of the magnetic tape and a data track 54 depends upon the ratio of the speed of the heads 16, 18, 46 and 48 to the speed of the magnetic tape. The conventional track angle in DAT recording is slightly larger than the helix angle, yielding a track width (h) of approximately 13.59$\mu$m. Data tracks 54 and 56 alternate with respect to azimuth angle. The primary head 18 records negative azimuth tracks 56, while the primary head 16 records positive azimuth tracks 54. By alternating azimuths, crosstalk from adjacent tracks during read operations is minimized.

Recording is performed by creating flux transitions on the tape. While it is not critical to the present invention, a ONE is represented by a flux transition at the beginning of a bit cell and a ZERO is represented by the absence of a flux transition in the bit cell. About 60% of a track 54 and 56 is occupied by a data area. The data area includes error correction codes. Automatic-track-finding (ATF) areas at both ends of a data area help a helical scan drive keep the heads 16, 18, 46 and 48 centered on a target track. The ATF areas contain signal patterns that repeat every four tracks. The heads are wider than a track and pick up the differing ATF signals from adjacent tracks for centering the read heads on track during reading. A servo system, not shown, compares the amplitudes of position data from the adjacent tracks to align a head precisely on a target track. Beyond the ATF areas are Sub-code areas which contains index information.

During a recording operation, one primary head 18 records the negative azimuth tracks 56, while the other primary head 16 records the positive azimuth tracks 54. The secondary heads 46 and 48 are used in a read-after-write manner to improve data integrity by reading tracks immediately after they have been written and causing a drive to rewrite data if necessary. One secondary head 46 has a positive azimuth to read data tracks 54 written by primary head 16 and the other secondary head 48 has a negative azimuth to read the data tracks 56 written by primary head 18.

Figure 3:
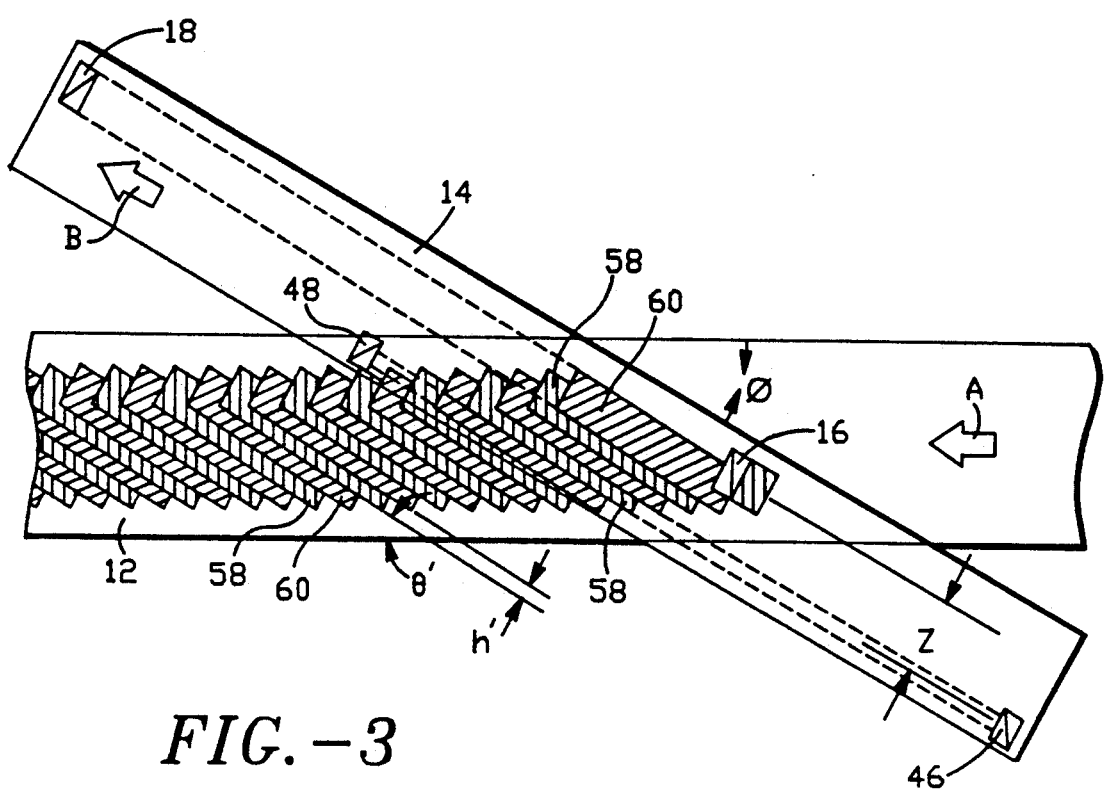
FIG. 3 is a schematic illustration of a magnetic tape and rotary drum assembly, wherein the magnetic tape has narrow, high density data tracks for which data track read-after-write occurs following 810° of drum rotation, and wherein the rotary drum and the magnetic tape are shown unwrapped into a planar condition.

Unlike the prior art in which the secondary heads 46 and 48 have a width equal to the width of the primary heads 16 and 18, here the secondary heads are narrower to allow reliable reading of the conventional data tracks 54 and 56 as well as narrower, high-density data tracks. Referring now to FIG. 3, by changing the ratio of speed between the magnetic tape 12 and the rotary drum 14, high-density data tracks 58 and 60 are written onto the magnetic tape. The helix angle ($\phi$) and the axial separation (z) remain the same, but the track angle ($\Theta'$) is changed slightly. An increase in the ratio of the head speed to the tape speed provides higher density data tracks, since a greater amount of overlap is achieved. The increase in the ratio may be accomplished by changing the speed of the tape, by changing the rotational speed of the drum 14, or by changing both.

As the widths of data tracks are reduced by increasing the overwriting of the successive data tracks 58 and 60, the ability of the device to operate reliably is affected. For example, if track widths are reduced to 6$\mu$m, a conventional head having a width of 20.6$\mu$m would overlap more than 3 tracks, rather than the current approximately 1.5 tracks. This would result in data being read from the track beyond the adjacent track. Since alternate tracks have the same track azimuth, crosstalk would obscure the desired data. Moreover, the servo data could be adversely affected, because present servo schemes rely upon a less than full overlap of tracks adjacent to a target track.

By reducing the size of the secondary heads 46 and 48, the present invention is able to accommodate both the conventional track density of FIG. 2 and the high density tracks of FIG. 3. The width (y) of the secondary heads should be less than 3 times the width of the data tracks 58 and 60 after overwriting occurs. This prevents a correctly centered secondary head from extending beyond the data tracks adjacent to a target data track. In the preferred embodiment, the secondary heads are approximately 1.5 times the width of the high-density data tracks.

In operation, the rotary drum 14 of FIG. 1 is rotated in a counterclockwise direction B by the motor-driven shaft 20. Simultaneously, the magnetic tape 12 is moved in the direction of arrow A. When the drum is rotated at 2000 rpm and the tape is displaced at 8.15mm/sec, the conventional width data tracks of FIG. 2 are obtained. Each primary head 16 and 18 overwrites data recorded on the data tracks 54 and 56 written by the other primary head, whereafter the secondary heads 46 and 48 verify that the data have indeed been properly recorded.

As noted above, increasing the ratio of the head speed to tape speed causes a greater amount of overwriting of data tracks. Consequently, the track width (h) of FIG. 2 may be reduced to the track width (h') shown in FIG. 3 by either slowing tape travel or rotating the drum more quickly. In conventional track width recording, the secondary heads 46 and 48 are delayed by approximately 450°. That is, for a particular target track the rotational delay from the beginning of the recording process to the beginning of read-after-write of the target track is one full revolution plus ninety degrees of drum rotation. An increase in track density necessarily increases the number of tracks between the primary heads 16 and 18 and the secondary heads 46 and 48, resulting in an increased rotational delay before read-after-write commences. The number of tracks should be increased in increments of two, i.e. one drum revolution, to preserve the correct track azimuth during read-after write. A rotary drum 14 having a diameter of 30mm may have an axial separation (z) of approximately 37.3$\mu$m. This axial separation and the helix angle ($\phi$) are fixed by the geometry of the rotary drum. Adjusting the ratio of the head-to-tape speed in such a way as to change the track angle from the conventional 6.383194° to an angle of 6.374917° provides a track width of 6.78$\mu$m. The secondary heads will then be delayed approximately 810° of rotation, relative to the writing of data by the primary heads, before the secondary head performs a read-after-write of the data.

As a further example, adjusting the ratio between the speed of the heads 16 and 18 and the speed of the magnetic tape 12 to achieve a track angle of 6.372177° provides a track width of 4.53$\mu$m. The read-after-write delay will then be 1170°. Such a delay would require provision of sufficient data buffer capacity in the read-after-write circuitry.

In conventional track width recording, the secondary heads 46 and 48 can alternatively be delayed by 270° of rotation during read-after-write, rather than the above-described 450° of rotational delay. To achieve higher track densities, the number of tracks between the primary heads 16 and 18 and the secondary heads must then be increased by increments of two, resulting in rotational delays of 270° plus n×360°, where n=0,1,2,3 ... Read-after-write delays other than 450° and 270° for conventional track width recording are also possible.

The secondary heads 46 and 48 provide read-after-write capability for either of the track densities shown in FIGS. 2 and 3. Unlike a read operation, read-after-write is performed without the aid of a tracking servo to locate the secondary heads over target tracks. As noted above, increases in track density require increases of n×360° in read-after-write delay. For each such increase in track density, a specific speed ratio exists that ensures that the secondary heads will be centered on the data tracks during read-after-write. The specific speed ratio varies with differences in structural factors such as the drum diameter, the helix angle, the wrap angle and the axial and circumferential positioning of the secondary heads relative to the primary heads 16 and 18. However, at lower track densities some latitude in positioning is allowable since the data tracks may be wider than the secondary heads. Where the data tracks are wider, the secondary heads can be positioned off center and yet remain within the boundaries of the data tracks.

During the read operation, because the primary heads 16 and 18 can be greater than three times as wide as the high-density data tracks 58 and 60, both reading and positioning errors would occur if the primary heads were utilized to read data. Thus, the secondary heads 46 and 48 are employed to read data from the high-density tracks. On the other hand, the secondary heads may be insufficiently wide to provide an accurate position error signal when reading data from the conventional width data tracks 54 and 56. Thus, the primary heads 16 and 18 are activated to read the conventional width data tracks of FIG. 2.

Figure 4:
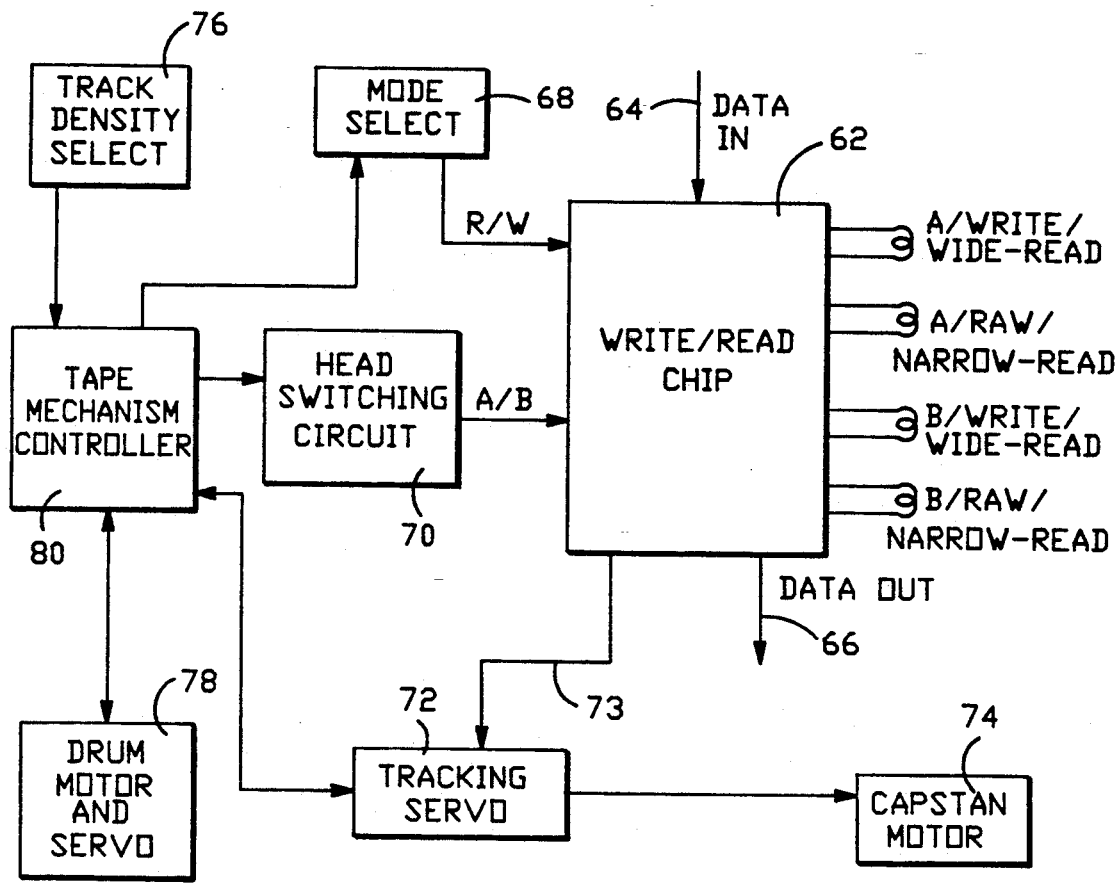
FIG. 4 is a block diagram of control circuitry for the recording device of FIG. 1.

Referring now to FIG. 4, a block diagram of relevant components is shown. The only component which is not found in conventional DDS systems is the Track Density Select 76, which will be described below. A Write/Read chip 62 has a Data In line 64 and a Data Out line 66. From these lines 64 and 66, data are channeled to and from the two primary heads, designated A/WRITE/WIDE-READ and B/WRITE/WIDE-READ, and the two secondary heads, designated A/-RAW/NARROW-READ and B/RAW/NARROW-READ. The source of data to the Data In line 64 is not critical. The present invention may be used with video, audio and computer applications. The Data Out line 66 is connected both to read-after-write circuitry and to data processing circuitry.

A Mode Select 68 determines whether the heads are executing a record operation or a read operation. A Head Switching Circuit 70 is utilized to alternate activation of the A and B heads. In the DDS format, the wrap angle of the magnetic tape around the rotary drum is only ninety degrees, so that at any given time only one of the four heads is in position to record or to read data. During a recording operation the Mode Select 68 and the Head Switching Circuit 70 act in concert to initiate a four-step continuous sequence in which the first and third steps are the recording of data by the appropriately positioned WRITE/WIDE-READ head and the second and fourth steps are the read-after-write of data by the appropriately positioned RAW/NARROW-READ head.

A Tracking Servo circuit 72 is employed during the read operation to maintain the heads in a position centered over target data tracks. A position error signal generated in the manner described above is received at the Tracking Servo circuit via line 73. The Tracking Servo circuit is electrically coupled to a Capstan Motor 74 to permit adjustment of the speed of the capstan so as to correct the position of the tape and track relative to the heads.

The Track Density Select 76 is employed in selecting the ratio of the speed of the heads to the speed of the magnetic tape. One or both of the speed of the Capstan Motor 74 and the Drum Motor 78 are adjusted to achieve the ratio required for a selected track width. The Track Density Select is electrically coupled to a Tape Mechanism Controller 80 that is connected to the Tracking Servo 72 and the Drum Motor and Servo 78 for controlling the capstan and drum.

As noted above, the secondary heads 46 and 48 are utilized to read data from the high-density data tracks 58 and 60 of FIG. 3, while the primary heads 16 and 18 read data from the conventional width data tracks 54 and 56 of FIG. 2. Selection may be made by a manually-operated switch. Thus, the Track Density Select 76 may merely be a toggle switch. An alternative is to provide information regarding track width within the Subcode areas of the data tracks and to channel the information to the Track Density Select, so that the heads to be used for reading are selected automatically via the Tape Mechanism Controller. A third alternative is to alter the structure of a tape cartridge that houses the magnetic tape according to data density. That is, in the same manner that data cartridges may include a Write-Inhibit Hole to prevent rerecording of a tape, a hole may be provided in the cartridge for recognition by a tape drive of which track density has been employed with a particular tape.

I claim:

1. A high density helical scan recording device comprising,
    a rotary drum,
    means for rotating said drum,
    a pair of narrow-read heads coupled to said rotary drum for rotation therewith,
    a pair of write heads coupled to said rotary drum for rotation therewith, said write heads each having a width greater than the width of each narrow-read head,
    a length of magnetic recording tape,
    means for linearly moving said length of magnetic recording tape along said rotary drum at an orientation to record and read data in data tracks diagonal to said length,
    means for selecting one of first and second ratios of the speed of said drum to the speed of said magnetic recording tape, said first ratio providing a rate of relative speed between said write heads and said magnetic recording tape such that the recording of data tracks by said write heads is at a low track density, said second ratio providing a rate of relative speed between said write heads and said magnetic recording tape such that the recording of data tracks by said write heads is at a high track density, and
    means for selecting said write heads during reading data tracks having said low track density and for selecting said narrow-read heads during reading of data tracks having said high track density.

2. The device of claim 1 wherein said write heads are first and second write heads, said first write head having an azimuth different from an azimuth of said second write head.

3. The device of claim 1 wherein said width of each narrow-read head is less than three times the width of data tracks having said high track density.

4. The device of claim 1 wherein each narrow-read head is positioned on said rotary drum relative to one of said write heads so as to provide read-after-write validation of data recorded by said write head, regardless of selection of said first and second ratios.

5. The device of claim 1 wherein said magnetic recording tape is a digital audio tape.

6. A method of achieving backward compatibility in the recording and reading of data in both wide, low density data tracks and narrow, high density data tracks comprising, providing a rotary drum having a pair of write/wide-read heads and a pair of narrow-read heads, with the widths of the write/wide-read heads being greater than the width of the narrow-read heads, providing a length of magnetic recording tape in contact with a portion of the circumference of the rotary drum and at an orientation to record and read data in data tracks diagonal to said length, selecting one of a first and second ratio of the speed of said drum to the speed of said magnetic recording tape, said first ratio providing recording of data tracks having a low track density and said second ratio providing recording of data tracks having a high track density, rotating said rotary drum and linearly displacing said magnetic recording tape at speeds to achieve the selected ratio, recording data in overlapping data tracks, including activating said write/wide-read heads to record data tracks at said low track density when said first ratio is selected and including activating said write/wide-read heads to record data tracks at said high track density when said second ratio is selected, and subsequent to completion of recording data in overlapping data tracks, reading said data recorded in said data tracks, including selecting said write/wide-read heads for reading data recorded at said first ratio and selecting said narrow-read heads for reading data recorded at said second ratio.

7. The method of claim 6 further comprising validating data recording in a read-after-write manner during said step of recording data.

8. The method of claim 6 wherein rotating said rotary drum and linearly displacing said magnetic recording tape at said second ratio of speeds cause each recording of a data track to overlap more than 60% of an adjacent data track.

9. The method of claim 6 wherein said step of recording data on said magnetic recording tape is a step of providing digital audio tape recording.

10. A high density helical scan recording device having a record mode for writing data and a read mode for reading data comprising, primary head means for sequentially recording data on a length of magnetic tape in data tracks disposed at a track angle to a lengthwise edge of said magnetic tape, rotary means for rotating said primary head means relative to said magnetic tape, means for providing relative movement between said magnetic tape and said primary head means at a first rate which causes greater than two-thirds of overlap of adjacent data tracks, each data track thereby having a reduced track width, and secondary head means, operatively associated with said rotary means, for reading data from said data tracks, said secondary head means having a width aligned generally parallel to the width of said data tracks, said width of said secondary head means being less than three times said reduced track width.

11. The device of claim 10 wherein said primary head means includes a first primary head having a width $(x)$ such that said reduced track width $(h)$ satisfies the condition that $0 > h > x/3$ and wherein said width $(y)$ of said secondary head means satisfies the condition that $y < 3h$.

12. The device of claim 10 wherein each of said primary head means and said secondary head means is a pair of magnetic heads fixed to said rotary means.

13. The device of claim 10 further comprising means for selecting one of said first rate of relative movement and a second rate of relative movement which causes less than two-thirds of overlap of adjacent data tracks, said first rate forming a high track density format and said second rate forming a lower track density format.

14. The device of claim 13 further comprising means for actuating said primary head means to read data from said data tracks of said lower track density format and for activating said secondary head means to read data from data tracks of said high track density format.

* * * * *

UNITED STATES PATENT AND TRADEMARK OFFICE
CERTIFICATE OF CORRECTION

PATENT NO. : 5,276,566

DATED : January 4, 1994

INVENTOR(S) : George M. Clifford, Jr.

It is certified that error appears in the above-identified patent and that said Letters Patent is hereby corrected as shown below:

Column 10, line 36, "that $0>h>x/3$" should read --$0<h<x/3$--

Signed and Sealed this

Fifteenth Day of November, 1994

Attest:

BRUCE LEHMAN

Attesting Officer     Commissioner of Patents and Trademarks